United States Patent
Wilkin (10) Patent No.: US 10,585,578 B2
(45) Date of Patent: Mar. 10, 2020

(54) ADAPTIVE SCROLLING THROUGH A DISPLAYED FILE

(71) Applicant: International Business Machines Corporation, Armonk, NY (US)

(72) Inventor: Nicholas Wilkin, Woking (GB)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/675,972

(22) Filed: Aug. 14, 2017

(65) Prior Publication Data
US 2019/0050125 A1    Feb. 14, 2019

(51) Int. Cl.
| | |
|---|---|
| *G06F 3/0485* | (2013.01) |
| *G06F 3/0481* | (2013.01) |
| *G09G 5/34* | (2006.01) |
| *G06F 3/147* | (2006.01) |
| *G09G 3/20* | (2006.01) |

(52) U.S. Cl.
CPC ........ *G06F 3/0485* (2013.01); *G06F 3/04812* (2013.01); *G06F 3/147* (2013.01); *G09G 5/34* (2013.01); *G09G 3/20* (2013.01); *G09G 2320/0252* (2013.01)

(58) Field of Classification Search
CPC .... G06F 3/0485; G06F 3/04812; G06F 3/147; G09G 5/34
See application file for complete search history.

(56) References Cited

U.S. PATENT DOCUMENTS

| | | | |
|---|---|---|---|
| 6,154,757 A * | 11/2000 | Krause | G06F 3/0219 715/205 |
| 6,462,752 B1 | 10/2002 | Ma et al. | |
| 8,381,121 B2 | 2/2013 | Gupta et al. | |
| 9,182,947 B2 | 11/2015 | Koul | |
| 2007/0192729 A1 | 8/2007 | Downs | |
| 2008/0163183 A1* | 7/2008 | Li | G06F 8/456 717/149 |
| 2008/0320396 A1* | 12/2008 | Mizrachi | G06F 3/0485 715/744 |
| 2014/0333675 A1* | 11/2014 | Nakaoka | G06F 3/0485 345/684 |
| 2016/0086499 A1* | 3/2016 | Liang | G09B 5/00 434/365 |

(Continued)

OTHER PUBLICATIONS

Unknown, "Highlighting Braces", WebStorm 2016.3 Help, last modified Mar. 22, 2017, 1 page https://www.jetbrains.com/help/webstorm/2016.3/highlighting-braces.html.

(Continued)

*Primary Examiner* — Angie Badawi
(74) *Attorney, Agent, or Firm* — Nathan M. Rau (57) ABSTRACT

Adaptive scrolling can be used to navigate through a file displayed in a viewing area of a screen of a computer system. A method of adaptive scrolling can include receiving a user input of a start indicator in the form of a character or format feature of the file and detecting an end indicator corresponding to the start indicator. The user input can define a bound section between the start indicator and the end indicator. The method can also include detecting user input of scrolling in the bound section and, in response, activating adaptive scrolling to accelerate the scrolling through at least a portion of the bound section towards the end indictor.

20 Claims, 5 Drawing Sheets

(56) References Cited

U.S. PATENT DOCUMENTS

2017/0243616 A1* 8/2017 Hamada .................. G09G 5/14

OTHER PUBLICATIONS

Unknown, "Motion: Scroll Text controls", Apple, published Dec. 8, 2016, 2 pages.
Unknown, "Eclipse jump to closing brace", printed Aug. 9, 2017, 1 page https://stackoverflow.com/questions/289342/eclipse-jump-to-closing-brace.
Feltham et al., "User Experience Steering", U.S. Appl. No. 14/953,225, filed Nov. 27, 2015.

* cited by examiner

ADAPTIVE SCROLLING THROUGH A DISPLAYED FILE

BACKGROUND

The present disclosure relates to navigation through displayed computer files and more specifically to adaptive scrolling through a displayed file.

User navigation through a displayed computer file is increasingly being carried out through the manipulation, by a user, of a cursor on a display screen, the cursor controlled by a pointing device that detects two-dimensional motion. Such pointing devices can include, but are not limited to computer mice, touchpads and touch-sensitive screens.

Many pointing devices include a scrolling function that enables a user to move the cursor up and down on the display screen. Scrolling functions can be controlled by actions such as moving the pointing device across a surface, moving a scrolling wheel on the pointing device, pointing and dragging a navigation bar on the side of a file and making a swiping gesture on a touch-sensitive screen. Speed controls of the cursor may be implemented by the speed at which the user moves the pointing device or carries out a scrolling action. Displayed files can include, but are not limited to, computer program/code files, text files, mathematical formulae and image slideshows.

SUMMARY

Embodiments may be directed towards a computer-implemented method for adaptively scrolling through a file contained within a computer system. The file can be viewable within a viewing area of a display screen of the computer system. The method can include receiving, from user input, through an input device communicatively coupled with the computer system, a start indicator that is located within the file and detecting, using at least one computer processor circuit of the computer system, within the file, an end indicator corresponding to the start indicator. The method can also include defining, with the at least one computer processor circuit, between the start indicator and the end indicator, a bound section of the file and detecting, through the input device communicatively coupled with the computer system, user-initiated scrolling within the bound section of the file. The method can also include activating, with the at least one computer processor circuit, in response to the detecting of the user-initiated scrolling, adaptive scrolling that accelerates, through the bound section of the file and towards the end indicator, the scrolling of the file.

Embodiments may also be directed towards a computer system configured to adaptively scroll through a file contained within the computer system. The file can be viewable within a viewing area on a display screen of the computer system. The computer system can include at least one computer processor circuit and an input device communicatively coupled to the at least one computer processor circuit. The computer system can include the display screen communicatively coupled to the at least one computer processor circuit and at least one non-transitory computer-readable storage medium having program instructions embodied therewith. The program instructions can be executable by the at least one computer processor circuit to cause the at least one computer processor circuit to receive, from user input, through the input device, a start indicator that is located within the file and detect, within the file, an end indicator corresponding to the start indicator. The program instructions can also cause the at least one computer processor circuit to define, between the start indicator and the end indicator, a bound section of the file and detect, through the input device, user-initiated scrolling within the bound section of the file. The program instructions can also cause the at least one computer processor circuit to activate, in response to the detecting of the user-initiated scrolling, adaptive scrolling, the adaptive scrolling accelerating, through the bound section of the file and towards the end indicator, the scrolling of the file.

Embodiments may also be directed towards a computer program product for adaptively scrolling through a file contained within a computer system. The file can be viewable within a viewing area of a display screen of the computer system. The computer program product can include at least one non-transitory computer-readable storage medium having program instructions embodied therewith. The program instructions can be executable by at least one computer processor circuit to cause the at least one computer processor circuit to perform a method. The method can include receiving, from user input, through an input device communicatively coupled with the computer system, a start indicator that is located within the file and detecting, within the file, an end indicator corresponding to the start indicator. The method can also include defining, between the start indicator and the end indicator, a bound section of the file and detecting, through the input device communicatively coupled with the computer system, user-initiated scrolling within the bound section of the file. The method can also include activating, in response to the detecting of the user-initiated scrolling, adaptive scrolling that accelerates, through the bound section of the file and towards the end indicator, the scrolling of the file.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the disclosure is amenable to various modifications and alternative forms, specifics thereof have been depicted by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, operations, and processes.

DETAILED DESCRIPTION

A method of adaptive scrolling through a file displayed in a viewing area of a display screen of a computer system is described herein. The file can include lines, passages or sections of characters and may be, for example, a computer code file, a text file, a media file, or other form of file containing viewable and/or editable content. The display screen can be a monitor, e.g., a flat-screen monitor, and the viewing area can include, for example, a window displayed on the monitor by a computer operating system or application.

A user of a computer or electronic device may wish to navigate at an accelerated pace through a section or passage of a particular file. In a file containing a computer program, instructions or code, for example, this may occur where the user wishes to rapidly scroll through a particular section of code. Computer code is often written and presented as nested sections which can be identified by an indicator character(s) such as brackets. A user may wish, for example, to navigate to the end of a nested section.

In a text file, a user may wish to scroll, at an accelerated pace, through a section of text that is defined by an indicator such as a heading, line break or section break.

A user navigating through a displayed file can use the method of adaptive scrolling which can be included as a supplemental feature in a file navigation system. For example, this can be included within an integrated development environment (IDE) or other source code editor, debugger or other such environment requiring and/or enabling navigation through computer program code. In another example, the method of adaptive scrolling may be included within a text editor used for editing text files or other form of editing program for images or other media content.

The method for adaptive scrolling can enable a user to scroll at an accelerated speed through a defined or bound section of the file while being enabling the user to scan the contents and prevent "overshooting" of the end of the defined section. The defined section may be bound or delimited by a start indicator and an end indicator. The start and end indicators can, in some embodiments, be opposing characters such as opening and closing brackets or braces, the next occurrence of a character or a formatting character. In some embodiments, a creator of the file can insert dedicated characters as start and end indictors to be used by a user displaying the file.

The adaptive scrolling method described herein can enable a computer user to identify a start indicator at the start of a section of the file being navigated through by using an input or action to mark the start indicator. An associated end indicator may be present, in the form of an opposing indictor, such as a closing bracket corresponding to a start indicator in the form of an opening bracket. In some embodiments, there may be an end indicator in the form of a next occurrence of the same form of indictor such as a section break or title.

In some embodiments, the method of adaptive scrolling can automatically find or detect the corresponding end indicator of the section. Alternatively, the user may identify the end section by an action or the user may confirm the automatically found end indicator. Defining the start indictor and the end indicator marks can provide a bound section within the file.

The adaptive scrolling method can determine an invocation of a scrolling function for scrolling the file in the bound section, between the start and end indicators. According to embodiments, the adaptive scrolling method can accelerate the pace of the scrolling once it has determined that the bound section is above a predefined length and that the user is scrolling above a specified "reading" scrolling speed. A specified "reading" scrolling speed can be determined by an average, recorded speed at which a user scrolls a file while the user is reading text, or can be input/set by the user as a parameter of the adaptive scrolling method. Once the end indicator is approached, reached or passed in the viewing area, the adaptive scrolling method may reduce the speed or stop scrolling, in response to user-specified configurations.

Figure 1:
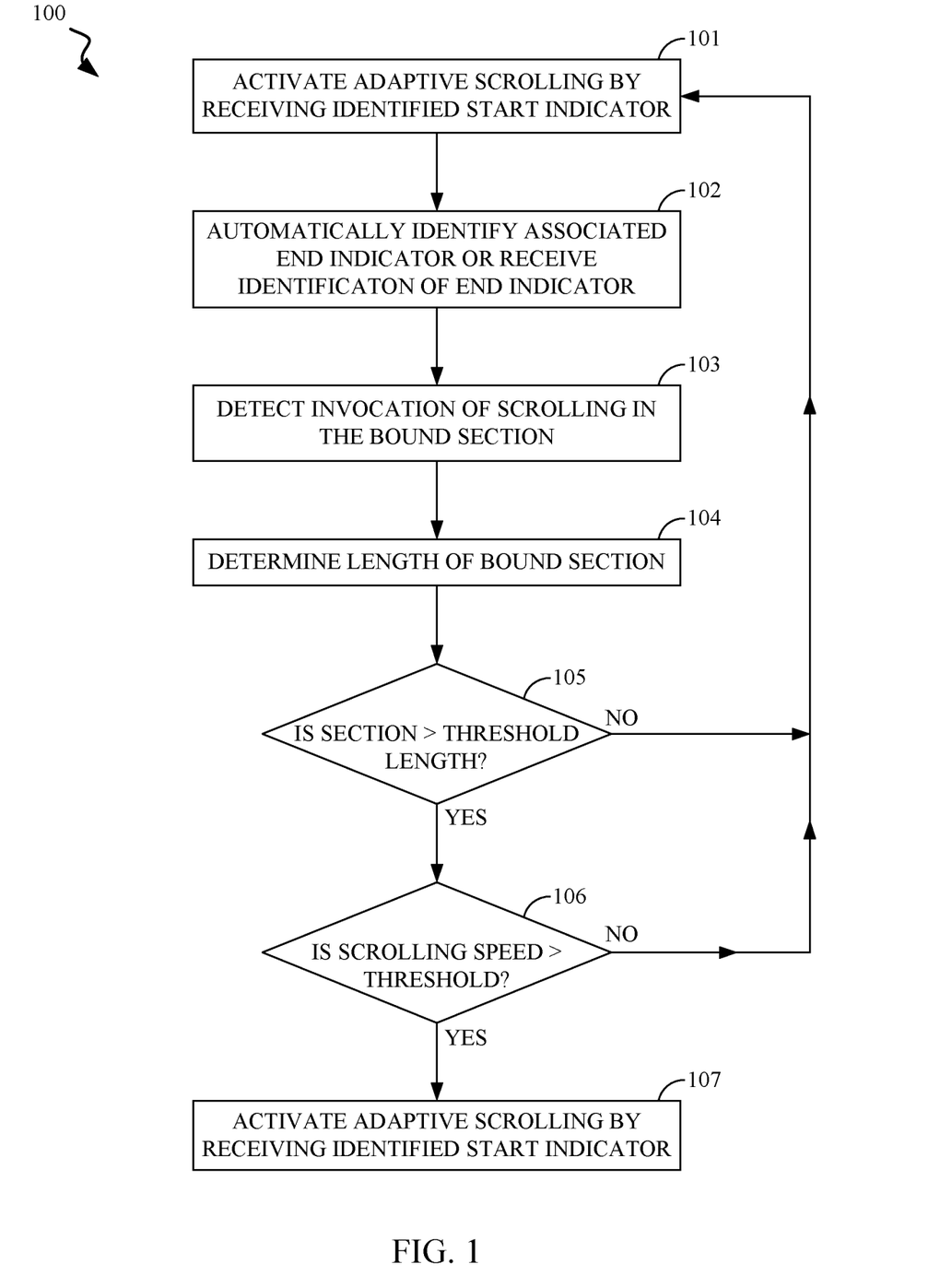
FIG. 1 is a flow diagram of a method of adaptive scrolling, according to embodiments of the present disclosure.

Referring to FIG. 1, flow diagram 100 depicts a method of adaptive scrolling. In operation 101, the method can activate an adaptive scrolling function by receiving, from the user, for example, through a computer input device, an input identifying a start indicator. As an example, the user may select, using an input device such as a mouse, touchpad, touchscreen or joystick, an editable character or format mark and choose an option to activate the adaptive scrolling. For example, an opening bracket in computer code may be selected by being highlighted by the user and the user right-clicking to choose an option to activate the adaptive scrolling. A short-cut key or action may be configured to activate the adaptive scrolling.

In operation 102, the method can automatically find or detect the paired end indicator associated with the selected start indicator. The paired end indicator can be an opposing indicator such as a closing bracket relating to a paired opening bracket, or may be a next indicator of the same time such as a next title or section break.

IDE software can have this detection natively built in and such environment may highlight the closing bracket or end of the section. This can be detected by searching within the file for a matched pairs of brackets or braces, e.g., "{ }," or file sections, e.g., "<div></div>."

In some embodiments, a user may select the end indicator in a similar manner to the selection of the start indicator. This may be done during the creation stage of the file such that an author may identify possible landmarks in the file that define various sections.

In operation 103, the method may sense or detect that a user has started scrolling after the start indicator. The length of the section bound between the start indicator and the identified end indicator may be determined in operation 104, for example, this may be determined by calculating the difference in the line numbers between the start indicator and the identified end indicator.

In operation 105 it may be determined if the bound section length is greater than a predefined threshold length. The predefined threshold length may be configured to be sufficiently long for it to necessitate the activation of the adaptive scrolling, as opposed to the user navigating to the end of the section. If the bound section length is not greater than the threshold, the method may loop to operation 101 to monitor activation of the adaptive scrolling for another start indicator.

If the bound section length is greater than the threshold, it may be determined, in operation 106, if the current scrolling speed of the user in the section is greater than or does not match a predefined scrolling speed. The predefined scrolling speed may be greater than or may not match an average reading speed indicating that the user is not reading the section. If the current scrolling speed is not greater than the predefined scrolling speed, the method may loop to operation 101 to monitor activation of the adaptive scrolling for another start indicator.

If the current scrolling speed is greater than the predefined scrolling speed, then the adaptive scrolling may be applied in operation 107 until the cursor reaches a point near or adjacent to the end indicator. The adaptive scrolling generally accelerates the scrolling towards the end indictor and then decelerates as it as the visible portion of the displayed file approaches or is adjacent to the end indictor; however, there are various options which are described in relation to FIG. 2.

Figure 2:
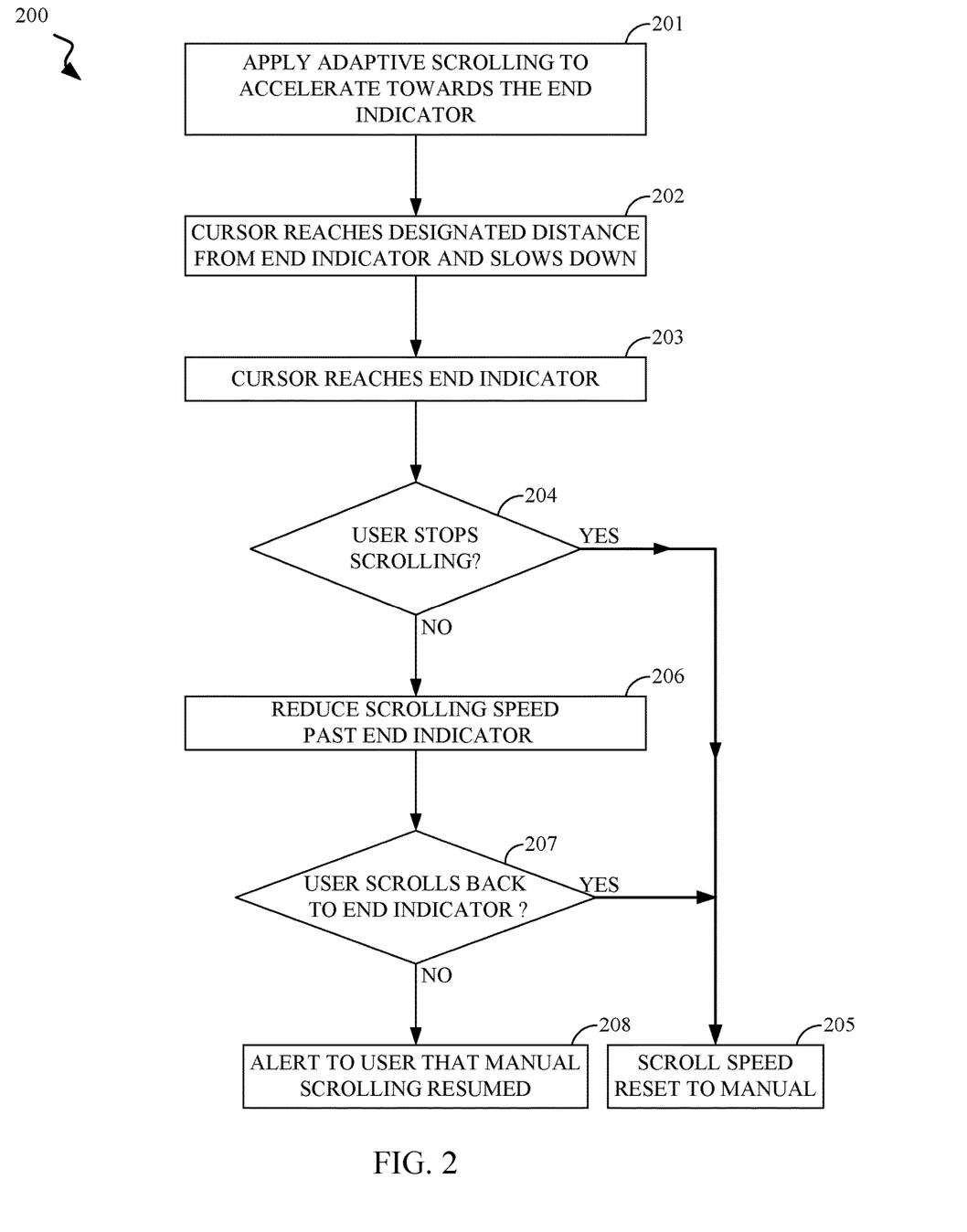
FIG. 2 is a flow diagram of a method of adaptive scrolling, according to embodiments consistent with the figures.

Referring to FIG. 2, a flow diagram 200 depicts a method of adaptive scrolling. Consistent with the method depicted in FIG. 1, adaptive scrolling is applied in operation 201, in a bounded section, between a start indicator and an end indicator to accelerate towards the end indicator.

The user may continue to perform the scrolling action or stop scrolling at any time, however, the speed of scrolling is determined by the adaptive scrolling method. In operation 202, the cursor may approach a designated distance from the end indicator and the scrolling speed may slow down, which can result in a smooth approach of the visible portion of the file to the end indicator.

In some embodiments, the designated distance may be a percentage of the length of the bound section, and in some embodiments the designated distance can be a specified number of text lines. In operation 203, the cursor may then reach the end indicator.

It may be determined in operation 204 if the user stops scrolling at the end indicator. If the user stops scrolling at the end indicator, the adaptive scrolling may be terminated and the scrolling speed reset, in operation 205, to a manually adjusted speed that is determined by the user.

If the user does not stop scrolling at the end indicator, the method may automatically reduce the scrolling speed in operation 206, for example, to a reading speed or slower.

In operation 207, it may be determined if the user scrolls back to the end indicator. If the user scrolls back to the end indicator, the adaptive scrolling may be terminated and the scrolling speed reset, in operation 205, to a manually adjusted speed that is determined by the user. If the user does not scroll back, an alert may be triggered in operation 208 to indicate to the user that manual scrolling is resumed and the scrolling control may revert to the user.

Figure 3A:
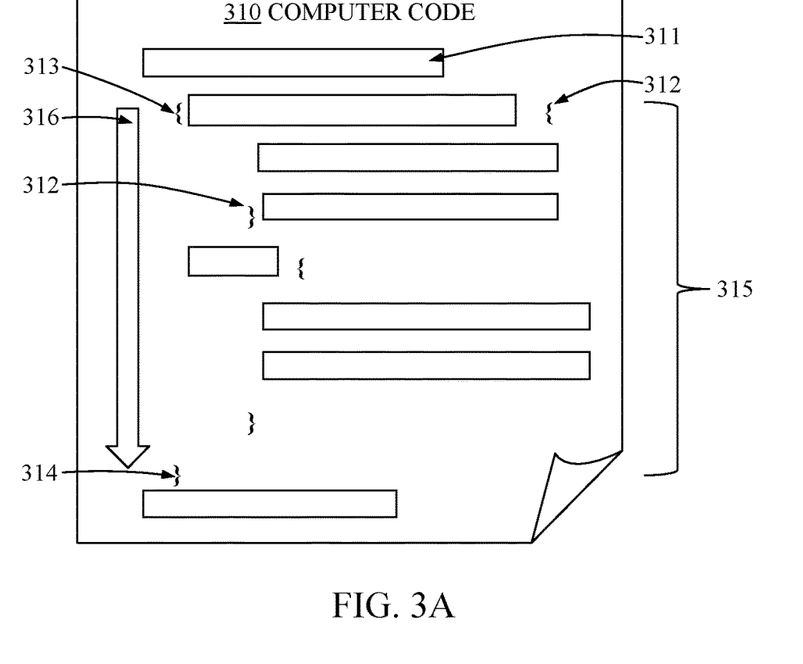
FIGS. 3A and 3B are diagrams depicting computer code and a text document, respectively, with lines of code and text depicted by boxes, according to embodiments consistent with the figures.
Figure 3B:
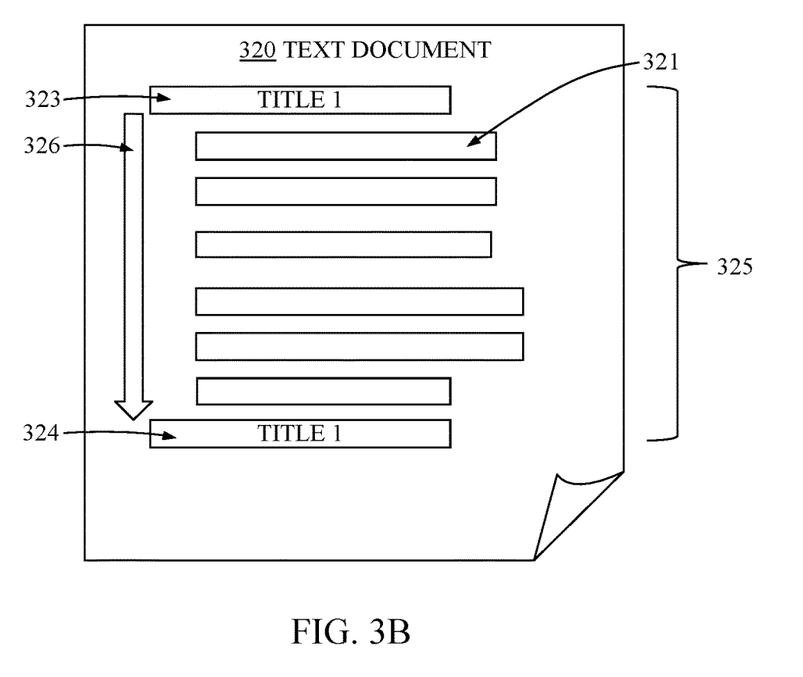

FIGS. 3A and 3B are diagrams depicting the application of the described method in two scenarios; a file containing computer code and a file containing a text document.

In FIG. 3A, a computer code file 310 is includes lines of code depicted by boxes 311. According to embodiments, the computer code file 310 may have pairs of nested brackets 312 defining statement blocks.

An opening bracket 313 can be selected by the user to function as a start indicator and the method may determine the corresponding closing bracket 314 as the end indicator. The bound section 315 can then have adaptive scrolling 316 applied to it, to accelerate the scrolling of the file, within the display window, to the end indicator.

The method of adaptive scrolling can make use of the awareness of paired opening and closing brackets, as depicted in FIG. 3A, to alter the user's scroll speed through a displayed document. As a user scrolls through a large document, towards the paired closing bracket, the scroll speed can be increased until the visible portion of the file approaches or reaches the closing bracket. According to embodiments, once the visible portion of the file is close to or passes the closing bracket, the scrolling speed may be reduced.

As an example, the user may select the opening bracket 313, which may be on line 5 of the computer code file 310. The method can identify the corresponding closing bracket 314, on, for example, line 5000 of the computer code file 310. The method can determine a significant difference in the line numbers, e.g., line 5 and line 5000. The program may monitor user activity for scrolling that does not match a reading or short scroll distance "pace" or speed. As the user begins scrolling, the program can increase the scroll speed until a line close to the "destination" is reached, at which point the program can reduce the speed to near-normal. As the cursor approaches the closing bracket 314, for example, at line 4500, the scrolling speed may be returned or reduced to a normal reading speed.

If the user passes the destination, the downward scroll speed can be reduced, giving a physical indication to the user that they have missed their intended stopping point. For example, if the user does not stop the scrolling at the closing bracket at line 5000, the adaptive scrolling may slow down the scrolling speed, for example to 75% of a normal reading speed. The user can then scroll back up to the end bracket 314 at line 5000 and stop, whereby the adaptive scrolling may be terminated.

When a user is viewing/editing a large block of code that has various opening and closing brackets, it can be unclear where the end of a function occurs while scrolling through it. It can be relatively easy for a user to become disorientated while scrolling through the file. The adaptive scrolling can be useful in alleviating this disorientation by causing accelerated scrolling to terminate at an appropriate end of the function.

In an IDE, the adaptive scrolling can be used in addition to known visual cues provided within computer program code. For example, an IDE can highlight the paired closing bracket and provide a visual cue to the user, and/or may provide a colored line on left side of screen showing the span of the code section.

In an IDE, large sections of code may be collapsed to give the appearance of a smaller document. A user may take advantage of this feature in navigating to the end of a function by collapsing the section of code, clicking on the close bracket, expanding the code, and then pressing any key to jump the editor to the current cursor location. However, such collapsing may not give the user an overview of the code and an intuitive "feel" or insight regarding the content which may be obtained by rapidly scrolling through the section.

Referring to FIG. 3B, a text document 320 is shown with lines of text depicted by boxes 321. The text document 320 may have defined formatted features that may be selected as start indicators, such as titles, section breaks, or other formatted regions.

A first formatted feature 323 can be selected by the user as a start indicator, and the method can determine a next formatted feature 324, of the same type, to be designated as the end indicator. In the case of a title being the selected formatted feature for the start indicator, a next title of the same style may be identified, for example, as the corresponding end indicator. In the context of such a selection, sub-section titles within a section can be ignored. In some embodiments, the document creator can indicate a pairing of formatted features. Such a pairing can be used by the adaptive scrolling method. The bound section 325 may then have adaptive scrolling 326 applied to it to accelerate the scrolling to the end indicator 324.

Figure 4:
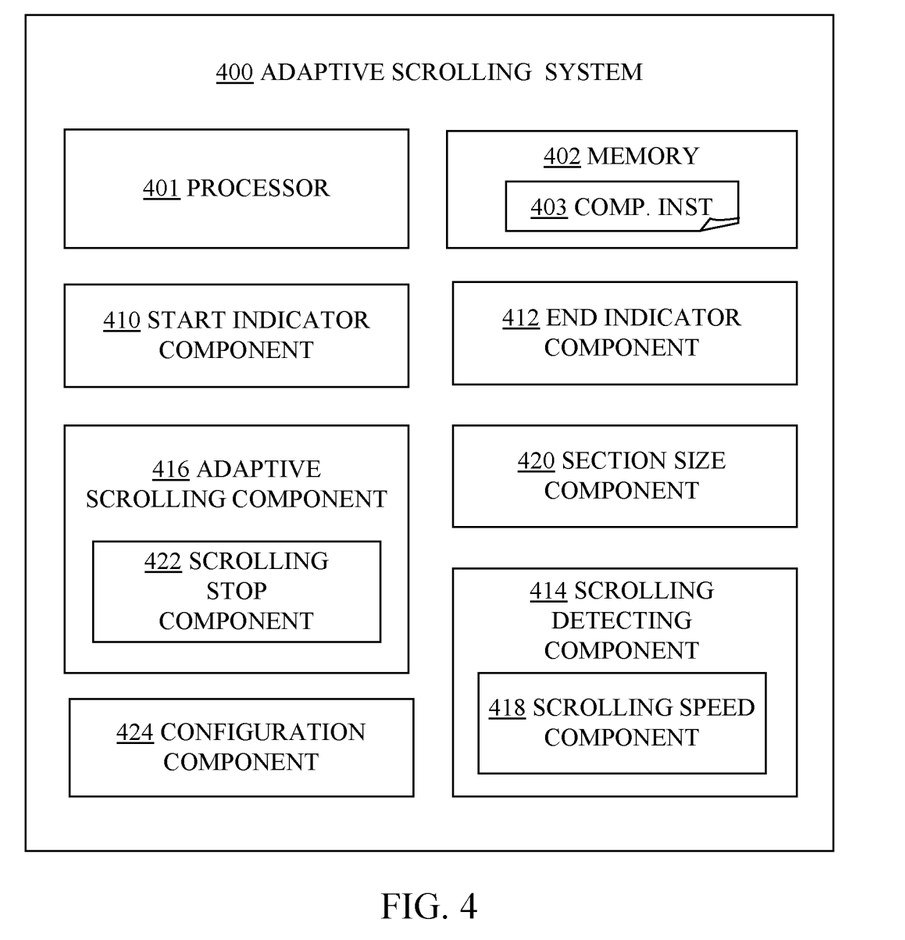
FIG. 4 is a block diagram depicting an adaptive scrolling system, according to embodiments consistent with the figures.

FIG. 4 is a block diagram depicting an adaptive scrolling system 400. The adaptive scrolling system 400 can include at least one processor 401, a hardware module or circuit for executing the functions of the described components, which may be software units executing on the at the least one computer processor circuit 401. Multiple processors running parallel processing threads can be used to enable parallel processing of some or all of the functions of the components. Memory 402 may be configured to provide computer instructions 403 to the at least one computer processor circuit 401 to carry out the functionality of the components.

The adaptive scrolling system 400 can be associated with a user input system that controls scrolling of a displayed file in response to input received from a computer user through an input device.

In some embodiments, the adaptive scrolling system 400 can be employed in association with an IDE for scrolling through a displayed computer code file. In embodiments, the adaptive scrolling system 400 can be integrated as an extension to existing section detection mechanisms, either through a plugin or included within the native code of the IDE. Some IDEs can allow for the installation of plugins, which can be useful in extending the user interface and the adaptive scrolling system 400.

In some embodiments, the adaptive scrolling system 400 can be used in association with a text editor for editing text files, or with other types of file editing or displaying programs suited for images and/or other media content.

The adaptive scrolling system 400 can include a start indicator component 410 for receiving, from user input, a start indicator in the form of a character or format feature of the file. The adaptive scrolling system 400 can also include an end indicator component 412 for detecting an end indicator corresponding to the start indicator. The end indicator component 412 can automatically detect a "next" end indicator in the file corresponding to the start indicator. The start and end indicators define a bound section within which the adaptive scrolling may be activated.

The adaptive scrolling system 400 can also include an adaptive scrolling component 416 used for activating adaptive scrolling, which can be useful in accelerating the scrolling through at least a portion of the bound section, towards the end indictor. The adaptive scrolling component 416 can be used to decelerate the scrolling, in a portion of the bound section, approaching the end indicator. The adaptive scrolling system 400 can include a section size component 420 used for determining if the bound section has a size greater than a predefined or specified threshold size, before the adaptive scrolling is activated.

The adaptive scrolling system 400 can also include a scroll detecting component 414 used for detecting user-initiated scrolling in the bound section that triggers the adaptive scrolling component 416. The scroll detecting component 414 can include a scrolling speed component 418 used for detecting a scrolling speed greater than an average or predefined "reading" scrolling speed.

The adaptive scrolling component 416 can include a scrolling stop component 422 used for terminating the adaptive scrolling at the end indicator and relinquishing or transferring manual control of the scrolling operations to the user.

The adaptive scrolling system 400 can include a configuration component 424 that receives user configurations for settings of the adaptive scrolling method. The settings can include the type of start and end indicators, e.g., characters or formatting features, the threshold size of the bound section of data to which adaptive scrolling is to be applied, a specified or predetermined reading scrolling speed, a percentage distance through a bound section at which acceleration stops and deceleration starts and any other configurable parameters.

Figure 5:
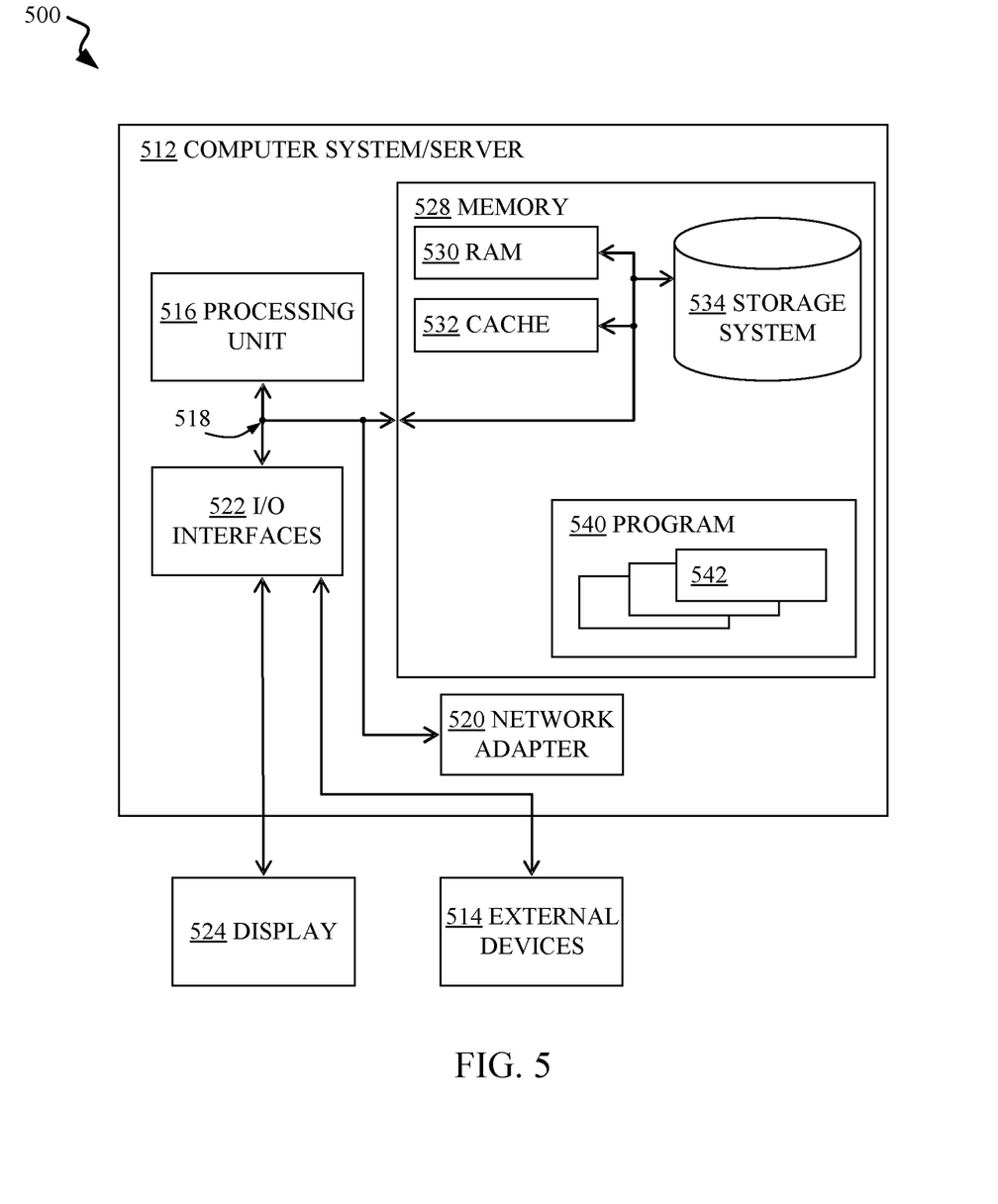
FIG. 5 is a block diagram of a computer system/server in which the present disclosure may be implemented, according to embodiments consistent with the figures.

FIG. 5 is block diagram depicting a system 500 in the form of a computer system or server. A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is depicted in the form of a general-purpose computing device. The components of the computer system/server 512 can include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 generally includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not depicted and generally referred to as a "hard disk drive"). Although not depicted, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 542, may be stored in memory 528 by way of example, and not limitation, and an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the disclosure as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not depicted, other hardware and/or software components could be used in conjunction with computer system/server 512. Examples, include, but are not limited to: microcode, device drivers, redundant processing units, external disk drive arrays, redundant array of independent disks (RAID) systems, tape drives, and data archival storage systems, etc.

The present disclosure may be a system, a method, and/or a computer program product at any possible technical detail level of integration. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the above. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/ or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures depict the architecture, functionality, and operation of possible implementations of systems, methods, and computer program products according to some embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks depicted in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the some embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for adaptively scrolling through a file contained within a computer system, the file viewable within a viewing area of a display screen of the computer system, the method comprising:
   receiving, from user input, through an input device communicatively coupled with the computer system, an input identifying a start indicator that is located within the file;
   detecting, using at least one computer processor circuit of the computer system, an end indicator that is located within the file, the end indicator corresponding to the start indicator;
   defining, with the at least one computer processor circuit, between the start indicator located within the file and the end indicator located within the file, a bound section of the file;
   detecting, through the input device communicatively coupled with the computer system, user-initiated scrolling within the bound section of the file; and
   activating, with the at least one computer processor circuit, in response to the detecting of the user-initiated scrolling, adaptive scrolling that accelerates, through the bound section of the file and towards the end indicator located within the file, the scrolling of the file.

2. The method of claim 1, wherein the detecting of user-initiated scrolling within the bound section of the file includes detecting a user-initiated scrolling speed that is greater than a specified reading scrolling speed.

3. The method of claim 1, wherein detecting the end indicator corresponding to the start indicator automatically detects, in the file, a next end indicator corresponding to the start indicator.

4. The method of claim 1, further comprising determining, prior to activating adaptive scrolling, if a size of the bound section is greater than a specified threshold size.

5. The method of claim 1, wherein the adaptive scrolling includes decelerating the scrolling within a portion of the bound section adjacent to the end indicator.

6. The method of claim 1, further comprising terminating the adaptive scrolling at the end indicator and transferring manual control of the scrolling to the user.

7. The method of claim 1, further comprising continuing the adaptive scrolling, at a specified reading scrolling speed, past the end indicator.

8. The method of claim 1, further comprising receiving, from a user, configurations for settings of the adaptive scrolling method.

9. The method of claim 1, wherein the file is selected from the group consisting of: a file of computer code, an editable text file, a viewable text file and another type of media content file.

10. The method of claim 1, wherein the start indicator and the end indicator include opening and closing brackets placed, within the file, to indicate a section of computer program code.

11. A computer system configured to adaptively scroll through a file contained within the computer system, the file viewable within a viewing area on a display screen of the computer system, the computer system comprising:
   at least one computer processor circuit;
   an input device communicatively coupled to the at least one computer processor circuit;
   the display screen communicatively coupled to the at least one computer processor circuit; and
   at least one non-transitory computer-readable storage medium having program instructions embodied therewith, the program instructions executable by the at least one computer processor circuit to cause the at least one computer processor circuit to:
   receive, from user input, through the input device, an input identifying a start indicator that is located within the file;
   detect an end indicator that is located within the file, the end indicator corresponding to the start indicator;
   define, between the start indicator located within the file and the end indicator located within the file, a bound section of the file;
   detect, through the input device, user-initiated scrolling within the bound section of the file; and
   activate, in response to the detecting of the user-initiated scrolling, adaptive scrolling, the adaptive scrolling accelerating, through the bound section of the file and towards the end indicator located within the file, the scrolling of the file.

12. The system of claim 11, wherein the program instructions are executable by the at least one computer processor circuit to further cause the at least one computer processor circuit to detect a user-initiated scrolling speed that is greater than a specified reading scrolling speed.

13. The system of claim 11, wherein the program instructions are executable by the at least one computer processor circuit to further cause the at least one computer processor circuit to detect, in the file, a next end indicator corresponding to the start indicator.

14. The system of claim 11, wherein the program instructions are executable by the at least one computer processor circuit to further cause the at least one computer processor circuit to determine, prior to activating adaptive scrolling, if a size of the bound section is greater than a specified threshold size.

15. The system of claim 11, wherein the program instructions are executable by the at least one computer processor circuit to further cause the at least one computer processor circuit to decelerate the scrolling within a portion of the bound section adjacent to the end indicator.

16. The system of claim 11, wherein the program instructions are executable by the at least one computer processor circuit to further cause the at least one computer processor circuit to terminate the adaptive scrolling at the end indicator and transfer manual control of the scrolling to the user.

17. The system of claim 11, wherein the program instructions are executable by the at least one computer processor circuit to further cause the at least one computer processor circuit to continue the adaptive scrolling, at a specified reading scrolling speed, past the end indicator.

18. The system of claim 11, wherein the program instructions are executable by the at least one computer processor circuit to further cause the at least one computer processor circuit to receive, from a user, configurations for settings of the adaptive scrolling method.

19. The system of claim 11, wherein the file is selected from the group consisting of: a file of computer code, an editable text file, a viewable text file and another type of media content file.

20. A computer program product for adaptively scrolling through a file contained within a computer system, the file viewable within a viewing area of a display screen of the computer system, the computer program product comprising at least one non-transitory computer-readable storage medium having program instructions embodied therewith, the program instructions executable by at least one computer processor circuit to cause the at least one computer processor circuit to perform a method comprising:
   receiving, from user input, through an input device communicatively coupled with the computer system, an input identifying a start indicator that is located within the file;
   detecting, within the file, an end indicator that is located within the file, the end indicator corresponding to the start indicator;
   defining, between the start indicator located within the file and the end indicator located within the file, a bound section of the file;
   detecting, through the input device communicatively coupled with the computer system, user-initiated scrolling within the bound section of the file; and
   activating, in response to the detecting of the user-initiated scrolling, adaptive scrolling that accelerates, through the bound section of the file and towards the end indicator located within the file, the scrolling of the file.

* * * * *